Patented Dec. 4, 1928.

1,694,123

UNITED STATES PATENT OFFICE.

ALPHONS O. JAEGER, OF CRAFTON, PENNSYLVANIA, ASSIGNOR TO THE SELDEN COMPANY, OF PITTSBURGH, PENNSYLVANIA, A CORPORATION OF DELAWARE.

CONTACT SULPHURIC-ACID PROCESS.

No Drawing.   Application filed March 10, 1927.   Serial No. 174,414.

This invention relates to processes for the production of sulphuric acid and sulphur trioxide by the contact sulphuric acid process.

In the patents of Alphons O. Jaeger and Johann A. Bertsch, No. 1,657,754, patented January 31, 1928, No. 1,657,753, patented Jan. 31, 1928, and co-pending Serial No. 88,488, filed February 15, 1926, processes are described for the catalytic oxidation of sulphur dioxide by means of zeolite catalysts, in which the catalytically effective element is chemically combined in non-exchangeable form in the zeolite itself. The processes may use zeolites which are undiluted or those which are diluted with various relatively inert substances, such as kieselguhr, pumice, and other carriers, either in a finely divided state or in the form of massive fragments. I have found that catalysts of great effectiveness possessing substantially all of the advantages of the zeolite catalysts, described in the application and patents hereinabove mentioned, can be obtained by introducing catalytically effective diluent bodies into zeolites and other base exchange bodies which are not themselves catalysts for the contact sulphuric acid process. The present invention possesses the advantage that it is not necessary to chemically combine the catalytically effective components in the zeolite structure and it is, therefore, possible to exercise a wide margin of choice in the catalytic component used. Apparently, the physical structure of the zeolite, coupled with its chemical characteristics, is effective, whether the catalytically effective component is itself chemically combined with the zeolite or merely associated therewith, preferably in a uniform and homogeneous manner. It is thus possible to utilize many valuable effective catalysts which could not be incorporated chemically in any zeolite. Thus, for example, I have found that many salts of vanadic acid, such as, for example, iron salts, silver salts, and the like, are extraordinarily effective catalysts when used as diluent bodies for zeolites which are not themselves catalytically effective. In addition to salts of vanadic acid, such as iron vanadate and silver vanadate, which are known to be fair catalysts, other salts of vanadic acid, such as copper, cobalt, nickel, uranium, titanium, manganese, chromium, aluminum, beryllium, zirconium and cerium vanadates, which are not normally considered as catalysts, when united with a base exchange body act as very effective catalysts. Not only, therefore, does the present invention permit the more effective usage of known catalysts, but it also transforms vanadic acid salts which are not usable as catalysts into highly effective contact masses. Such salts of vanadic acid cannot, of course, be catalytically combined with the zeolite, and, therefore, the field of available catalysts is greatly increased due to the fact that it is not necessary to restrict oneself to products which can be chemically incorporated in a zeolite or other base exchange body. I am not sure why the zeolites, which are themselves not catalysts or at any rate not effective catalysts, can transform such catalysts as, for example, salts of vanadic acid, into contact masses of extraordinary activity. I was formerly of the opinion that it was necessary to chemically combine the catalytically effective component with the zeolite itself, and this opinion is expressed in the joint application, and patents, above referred to. Whether or not this may be the reason for the catalytic efficiency of the zeolites there described, is not definitely proven, but I am of the opinion that this factor is not the only one and perhaps not the most important one in determining whether or not a particular zeolite complex is an efficient catalyst. I am now of the opinion that the physical structure of the zeolite is perhaps of greater importance than the chemical combination of the zeolite with the catalytic elements. It seems probable, however, that the zeolite does not act purely as a microporous inert carrier, since other carriers of comparable porosity do not possess all of the advantages of zeolites. I am, therefore, of the opinion that the zeolite also acts as a chemical activator of the catalyst, although not chemically combined therewith. I believe that the high molecular silicic acid complex of the zeolite constitutes an important chemical activator or promoter, which enhances the activity of the catalyst embedded therein, apart from its physical characteristics. The above explanations are not in any sense intended to limit the invention, but merely constitute the best explanation which I know at the present time to account for the remarkable effectiveness of the catalysts which are prepared according to the present invention, an effectiveness which far exceeds the sum of the catalytic effectiveness of the zeolite itself and the catalyst embedded therein.

In the following specification and claims, a sharp distinction will be drawn between substances which are actual practical catalysts for contact sulphuric acid and other substances, which, while they may have a certain amount of catalytic activity, are nevertheless incapable by themselves of acting as catalysts giving commercially satisfactory yields. Thus, for example, certain iron zeolites may be used for the catalytic oxidation of sulphur dioxide, but cannot be used practically as the yields run but little above 50 or 60%. In the present application, therefore, an effective catalyst will be defined as one which is capable of giving yields better than 70 or 75% under ordinary operating conditions. This line is not drawn on a basis of actual chemical differences, but constitutes one of practical utilization. It should be understood also that when a diluent is spoken of a "catalytically effective component," what is meant is that a diluent when incorporated or associated with a zeolite is capable of giving satisfactory yields in a contact sulphuric acid process. In many cases, the diluent used alone would not be an effective catalyst within the meaning of the term as used in the present specification. In the present invention, any zeolite or base exchange body which is not itself an effective catalyst may be used. In addition to the ordinary zeolites which are base exchanging polysilicates, the reaction products of two kinds of reacting components, there are also included base exchanging polysilicates which are the reaction products of more than two kinds of components, and which for simplicity will be hereinafter referred to as multi-component zeolites, and base exchange bodies which do not contain silicon and which will be referred to as non-silicious base exchange bodies. The words "base exchange body" will be used generally to cover these three classes. It should be understood that I do not claim herein the multi-component zeolites and non-silicious base exchange bodies as new chemical compounds, this constituting the subject-matter of my co-pending applications, Serial No. 142,783, filed October 19, 1926, and Serial No. 171,727, filed February 28, 1927.

The base exchange body containing a catalytically effective diluent may or may not constitute a single base exchange body and a mixture of a plurality of base exchange bodies belonging to one or more of the above indicated classes may be used. A plurality of catalytically effective elements may also be incorporated with or without further diluents, which may be inert or which may act as activators, promoters or stabilizers of the catalyst components themselves.

The base exchange bodies can be prepared in a wet form or by fusion methods as is well known to the art and as has been described in my co-pending applications, above referred to, and also in the co-pending joint applications of A. O. Jaeger and J. A. Bertsch, Serial No. 100,116, filed April 6, 1926, Serial No. 95,771, filed March 18, 1926, and Serial No. 91,229, filed February 27, 1926.

In every case, however, the base exchange bodies retain their advantageous high absorptive and adsorptive characteristics, their mechanical strength, and honeycomb-like, microporous structure. They are also in many cases chemical activators or may be considered also as physical activators, due to the fact that the minute capillary pores with their enormous surface energy bring the reacting gases in higher concentration or under higher partial pressures into contact with uniformly distributed, catalytically effective components under such conditions as to prevent, to a great extent, local overheating and consequent injurious effect on the reaction equilibrium.

There are a number of methods of introducing diluents into a base exchange body and one or other of these methods can be employed in the case of catalytically effective diluents which are included under the present invention.

1. The catalytically effective diluents may be mixed with one or other of liquid components of the base exchange body to be formed when the latter is prepared by wet methods.

2. The catalytically active components can be precipitated or incorporated by impregnation or by any other manner into diluent bodies which are themselves not catalytically effective and which may be inert, activating, stabilizing or promote stabilization. These diluent bodies are then incorporated into the base exchange body by any of the other suitable incorporation methods.

3. The catalytically effective diluents are to be mixed with the base exchange bodies when the latter are in the form of gels by kneading or stirring, in which case the base exchanging gel may be considered more or less as an adhesive. The homogeneity and uniformity of the distribution of the catalytically effective elements is, of course, not as great by this method as by methods 1 and 2, but for many purposes extreme uniformity is not necessary and may even be undesirable.

4. The catalytically effective components may be formed during the formation of the base exchange body in the same by mixing suitable components with the components of the base exchange body so that the reaction, whereby the latter is formed, will also form the catalytically effective diluent particles. The addition of protective colloids may be desirable to prevent coagulation of the diluent particles before the base exchange body has become sufficiently set.

5. A somewhat similar method to 4 can be used in which part of the base exchange body components react with the catalytically effective components during base exchange body formation to produce the necessary catalytically effective particles. Thus, for example, salts of vanadic acid can be introduced into a base exchange body by using an excess of a metal salt component during base exchange body formation to react with and form salts of vanadic acid.

6. Ready prepared base exchange bodies, diluted or undiluted artificial or natural can be impregnated with true or colloidal solutions of the catalytically effective components, the product thereafter being dried.

7. A ready prepared base exchange body, diluted or undiluted, may be impregnated with a plurality of solutions which react therein to precipitate the catalytically effective diluent.

8. Soluble, catalytically effective compounds can be added to the components forming a base exchange body which after formation retains the catalytically effective components in solution and is dried without washing or is treated to precipitate the catalytically effective compounds.

9. The natural or artificial base exchange bodies, diluted or undiluted, may be impregnated with solutions of catalytically effective compounds which are then precipitated by treatment with gases.

The above nine methods briefly recapitulate the general methods of incorporating diluents into base exchange bodies. Of course, other means may be used and particularly a combination of two or more of the above described methods may be utilized and is frequently desirable. In general, any of the methods described in the co-pending application of Jaeger & Bertsch, Serial No. 95,771, filed March 18, 1926, can be employed mutatis mutandis, to introduce catalytically effective diluents into base exchange bodies or mixtures of base exchange bodies.

The diluted base exchange bodies of the present invention may be further treated with salt solutions to introduce bases in exchangeable form, which bases may themselves have some catalytic activity, but which are usually of an activating or stabilizing nature or promote the stabilization of catalysts. The base exchange body after formation may also be treated with compounds containing acid radicals which are not in themselves effective catalysts to form the so-called salt-like bodies with the base exchange body.

The base exchange bodies may be incorporated with diluents by a fine mechanical mixture, followed by forming into workable fragments by means of a suitable adhesive. In general, however, this method of preparation does not produce a uniformly fine and homogeneous subdivision of the catalytically effective component with the base exchange body, and contact masses so produced are generally not as efficient as those prepared by the wet methods referred to hereinabove. Nevertheless, however, it is possible to make contact masses by this method and they are included in the scope of the present invention. It should be also understood that many of the nine methods described above in connection with base exchange bodies prepared by wet processes can also be utilized in connection with the well known fusion processes for the production of base exchange bodies. The applicability will be obvious to the skilled chemist.

In general, is should be understood that contact masses of the present invention contain at least two kinds of components, namely, a catalytically effective component physically combined with a base exchanging component which is not itself an effective catalyst. The contact masses, may, however, in addition to these two components, contain others, such as diluents of a porous or other nature, chemical compounds admixed mechanically or united by physical means with the contact mass, or produced by treatment thereof, which act as stabilizers and tend to smooth out undue violence of reaction. Notably, compounds which are salts of alkali-forming and similar metals, such as earth metals, act as stabilizers. Certain other compounds, notably compounds of many amphoteric metals and compounds which contain silicic acid, appear to enhance and amplify the stabilizing effect of the salts of the basic metals and these compounds I have termed "stabilizer promoters." Obviously, of course, in many cases, a single component may perform more than one function. Thus, a zeolite may act as a base exchange body with its desirable, physical structure and it may, by virtue of the alkali contained therein, act also as a stabilizer, and, by virtue of the silicic acid present, act as a stabilizer promoter. All such products, when used for the catalytic oxidation of sulphur dioxide, are included within the present invention.

Among the elements from which catalytically effective components can be prepared are the metal elements of the 5th and 6th groups of the periodic system such as vanadium, molybdenum, tungsten, uranium, chromium, manganese, arsenic, antimony, tantalum, niobium and bismuth. In addition to these particularly catalytic elements, other metal elements such as manganese, beryllium, aluminum, titanium, iron, copper zirconium, zinc, lead, silver, cerium, nickel, cobalt, boron and the rare earths may be associated and enhance the activity of the catalyst in many cases. The most important catalytically effective components are those which contain platinum and vanadium, such as, for example, metallic platinum, platinum compounds, and the oxides, salts and other compounds of the trivalent, tetravalent and pentavalent vanadium. Some particularly effective salts are the vanadates and vanadites of the metals such as iron, copper, silver, nickel, cobalt, titanium, zirconium, cerium, aluminum, calcium, cadmium uranium, chromium, manganese, etc. Vanadic oxide is also an important catalytic component. It should be borne in mind that the amount of the catalytic component is relatively small in comparison with the mass or more particularly the volume of the contact mass as a whole and in general the catalytically effective component will not exceed 5 or 10% of the total weight of the contact mass.

The additional diluent bodies with which the catalytically effective components can be associated in the base exchange body are not limited and any suitable diluents can be used. I have found that diluents which have high adsorptive and absorptive powers act as activators by reason of their physical characteristics and are very desirable. The particle size of the diluents may vary within wide limits, but I have found that finely divided diluents, particularly those less than 60 microns are advantageous as they produce a more homogeneous product. Among the diluents may be mentioned kieselguhrs of all kinds, with or without preliminary treatments, fuller's earth, talc, pulverized catalytically ineffective base exchange bodies of natural or artificial origin, rocks, stones, tuffs, trass, lava, etc., of volcanic or eruptive origin, green-sand, slag wool, pulverized slag, cement, silica gel, quartz filter stones, pulverized earthenware, pulverized natural or artificial silicates, glasspowder, graphite, pulverized minerals rich in quartz, pumice meal, metal powders, and metal alloy powders, pulverized un-glazed porcelain, and the like. In general, any of the diluents described in the application of Jaeger and Bertsch, Serial No. 95,771, filed March 18, 1926, may be used singly or in mixtures.

It will be readily seen that the number of possible catalysts is enormous and many of them, particularly where the proportions of the catalytically effective components and associated compounds are properly chosen, are of extraordinary effectiveness. The physical characteristics of the products, of course, will vary in accordance with the conditions under which they are prepared and any of the general methods and conditions described in the applications mentioned above of Jaeger & Bertsch, Serial No. 100,116, filed April 6, 1926, Serial No. 95,771, filed March 18, 1926, and Serial No. 91,229, filed February 27, 1926, and my co-pending applications, Serial No. 142,783, filed October 19, 1926, and Serial No. 171,727, filed February 28 1927, will be used and are illustrated in the examples.

In general, the contact masses to be used for the oxidation of sulphur dioxide should be given preliminary treatment with air or $SO_2$ containing gases or both. The catalytic reaction brings about certain changes in the chemical composition of the base exchange bodies, without, however, affecting their physical structure. Therefore, I do not wish to be understood as maintaining that the catalysts remain unchanged during the reaction and they are defined as of the time of preparation as is customary in catalytic chemistry. These secondary transformations are sometimes relatively ineffective; in other cases, they may be important in controlling the catalytic efficiency of the mass. Thus, for example, during the contact sulphuric acid process, the $SO_3$ produced will usually react with the base exchange bodies present and will react with the alkali present, forming certain alkali bisulphates or bisulphates of the exchangeable bases which may be present. These compounds for the most part are stabilizers so that in many cases the reaction itself produces in the catalyst the necessary stabilizer. Where a greater amount of stabilizer is required, it may be added in the form of the desired salt or the basic oxide may be added and further amounts of stabilizer produced by the reaction itself.

The invention will be illustrated in detail in the following examples, which are to be understood merely as illustrations of certain methods of carrying out the principles of the invention, which is in no sense limited to the exact details therein set forth. It should be understood, however, that in many of the examples, specific features of great value are described and such features are included in the narrow and preferred embodiments of the invention, although they do not limit its broad scope.

*Example 1.*

12 parts of $V_2O_5$ are dissolved by means of 12.4 parts of 90% KOH in 200-250 parts of water, and 80 parts of infusorial earth are stirred in. The suspension obtained is then treated with 7.12 parts of ferric chloride dissolved in 100 to 150 parts of water, the temperature being maintained at about 40° to 50° C. After all the ferric chloride has been added, the reaction mixture is made neutral to litmus by the gradual addition of 2N sulphuric acid. A mixture of ferric vanadate and infusorial earth is obtained, which is separated from the mother liquor by filtration, and then washed with 200 parts of cold water. 90.5 parts of 33° Bé. waterglass are diluted with four to five volumes of water, and the filter cake containing ferric vanadate and infusorial earth is added with vigorous stirring in order to obtain a uniform distribution. 60 parts of aluminum sulphate with 18 mols of water are dissolved in 200 parts of water and sufficient N/10 potassium hydroxide solution is added to dissolve up the aluminum oxide which is at first precipitated, forming a potassium aluminate solution. The aluminate solution is then stirred into the suspension and the mixture heated up to about 60° C. A gelatinous precipitate is obtained almost at once, and is increased by the gradual addition of 2N sulphuric acid. Care should be taken, however, that a weak alkalinity to phenolphthalein is maintained. The stirring is continued for an hour, the mixture being gradually permitted to cool down to room temperature. The gelatinous precipitate obtained is pressed and washed with 200 parts of water in small portions. The yellow filter cake is then dried at about 80° C., and broken into fragments of suitable size.

Two to four volumes of the contact mass thus produced are placed in a contact sulphuric acid converter and a thousand to two thousand volumes of 7–9 per cent burner gases are passed over the catalyst per hour at temperatures of about 450° to 500° C. A yield of 96 to 98.5% of the theoretical is obtained. The catalyst is very resistant to high temperatures.

Instead of using iron vanadate as a diluent in the zeolite formed other catalytically active salts of vanadium, such as the vanadites or trivalent vanadium salts, may be substituted.

Equivalent amounts of salts of tetravalent and pentavalent vanadium, such as for example, the nickel, cobalt, manganese, uranium, copper, aluminum, titanium, silver, barium or calcium salts, may be used, either singly or in admixture, as catalytically active diluents in the zeolite. These catalysts are capable of giving yields up to 98.5% of the theory under reaction conditions as outlined above.

In order to increase the resistance of these contact masses to high temperatures up to 650° C., other bases can be introduced by base exchange. Thus for example, the zeolite catalysts after drying and hydrating with water can be digested with 5 to 10% solutions of salts of copper, nickel, calcium, strontium, silver or titanium, in order to replace part of the alkali by these metals.

The above described contact masses in which the zeolite is a carrier can also be coated or affixed to massive carriers, such as for example, burnt pyrites, titanium dioxide, ilmenite, bauxite, chromium oxide, manganese dioxide, copper dioxide, materials rich in silicic acid such as roughened fragments of quartz, flint, pumice fragments, broken quartz filter stones; or artificial carriers rich in silicic acid, such as for example carriers prepared from kieselguhr and waterglass, kieselguhr and potassium aluminate, zeolites, kieselguhr and alkalies, or alkali salts and the like. Metals and metal alloys may also be used, such as for example aluminum granules, roughened fragments of ferro-vanadium, ferro-molybdenum, ferro-silicon, silicon-ferro-manganese, silicon-aluminum-ferro-manganese, ferro-titanium, ferro-tungsten, and the like. These contact masses can be prepared by causing the waterglass-infusorial earth-iron vanadate suspension to adhere to the carriers, and then forming the zeolite by the addition of the aluminate solution, or by spraying with an aluminum sulphate solution, in which case a zeolite is produced which is of the aluminum double silicate type.

It is sometimes advantageous in preparing contact masses to introduce diluent bodies, which can then be removed by washing or by calcining. Thus for example, 5 to 10% of flour, starch or sugar can be incorporated into the catalyst during the formation of the zeolite and later removed by washing or calcining, leaving still further pores in the contact masses, and thereby increasing its effectiveness as a catalyst.

The salts of tetravalent and pentavalent vanadium can also be substituted partially by salts of the oxygen containing acids of the metals of the fifth and sixth groups of the periodic system, as for example, tantalum, tungsten, molybdenum and chromium. Where, however, highly effective catalysts are desired, the substitution of these other catalytic components should not exceed 10 to 15%.

It should be understood in general that the catalysts of the following examples can also be coated onto the massive carrier fragments, as has been described in detail in connection with the catalysts of the present example.

*Example 2.*

18.2 parts of $V_2O_5$ are dissolved in the least quantity of normal sodium hydroxide solution, in order to form the sodium metavanadate. 34 parts of silver nitrate dissolved in 250 parts of water are then added with vigorous stirring, precipitating out the yellow silver vanadate. The precipitate is permitted to settle, decanted several times with water to remove the sodium nitrate formed, and then 500 parts of a 33° Bé. potassium waterglass solution diluted with eight to ten volumes of water are added. 42.5 parts of aluminum oxide are dissolved in 2N potassium hydroxide to form potassium aluminate, and this solution is then poured into the silver vanadate-waterglass suspension with vigorous agitation, the temperature being maintained at about 40–50° C. In a short time considerable amounts of aluminum zeolites are formed, and the yields are greatly increased by a cautious addition of N/2 sulphuric acid, care being taken that a weakly alkaline reaction to phenolphthalein remains after the last addition of sulphuric acid. The zeolite containing silver-vanadate in a fine state of division is then pressed in the usual manner, dried at temperatures up to 80°, and hydrated by causing four to five volumes of water to trickle over it. The hydration causes the product to break up into small fragments, which are then treated with a 5% calcium chloride or strontium chloride solution, in order to substitute part of the alkali of the zeolite of calcium or strontium.

Instead of using 42.5 parts of aluminum-oxide in the form of a potassium aluminate solution, 28.3 parts of aluminum oxide may be so used, together with 14.2 parts of aluminum oxide in the form of a 5% aluminum sulphate solution. The potassium aluminate solution is first added to the waterglass-silver vanadate suspension, and then the aluminum sulphate solution is added with vigorous agitation, the reaction mixture solidifying to a thick gel of a so-called multi-component zeolite, in which silver-vanadate is present as a catalytically effective diluent.

Aluminum oxide, which behaves as an amphoteric metal oxide in this composite catalyst, can also be substituted partly or wholly by other amphoteric metal oxides, especially beryllium oxide, cadmium oxide and chromium oxide. These oxides may be introduced partly or wholly either in the form of the alkaline metal metallates or in the form of metal salts. Instead of silver vanadate, other vanadates of the heavy metals can be used as catalytically effective diluents. Similar salts of tetravalent vanadium are also effective. In general, such contact masses which contain about 10 to 15% of catalytically effective diluents are excellent contact masses for catalytic oxidation of sulphur dioxide. 7% burner gases freed from dust, but containing the so-called catalyst poisons are passed over these contact masses at 450–550° C., and in a short time an excellent contact sulphuric acid process begins, giving yields up to 96% of the theory.

*Example 3.*

15 parts of $V_2O_5$ are dissolved in a solution containing 15 parts of 90% sodium hydroxide in 250 parts of water. About 70 parts of diatomite brick refuse of celite is stirred in, and the mixture heated to 50–60° C. A ferric chloride solution containing 9 parts of ferric-chloride in 150 parts of water is then added with vigorous agitation, and after all the ferric chloride has been added the reaction mixture is rendered neutral to litmus by means of 2N sulphuric acid, and permitted to cool down to room temperature. A diluted iron vanadate precipitates out and is sucked and washed.

200 parts of 33° Bé. waterglass are diluted with 400–600 parts of water, and the iron vanadate filter cake suspended therein. 26.4 parts of ferric sulphate with 9 mols of water are dissolved in 250 parts of water, or instead of the ferric sulphate solution a solution containing 29.3 parts of manganese sulphate with 4 mols of water can be prepared, or an equivalent mixture of ferric and manganese sulphates may be used. The ferric sulphate solution or manganese sulphate solution is then introduced into the waterglass-iron-vanadate suspension with vigorous agitation, the whole mass soon solidifying to a yellow gel which shows an alkaline reaction to phenolphthalein. The gel is recovered from the mother liquor in the usual way by pressing and drying at temperatures under 100° C., and contains an iron zeolite in which both catalytically effective and catalytically indifferent diluents are embedded.

The contact mass is broken into fragments and first blown with air, the temperature gradually rising to 450° C. Thereupon the contact mass is treated with gases containing 4 to 6% of $SO_2$ and air, and constitutes an effective catalyst for the contact sulphuric acid process. The contact mass is extraordinarily resistant to high temperatures and retains its effectiveness.

*Example 4.*

A diluted aluminum zeolite is formed by introducing 60 to 80 parts of finely ground silicatae rock, burnt pyrites or infusorial earth into 90 to 100 parts of a 33° Bé. waterglass solution which has been diluted with 300–500 parts of water, and which is then caused to react with a potassium aluminate solution prepared by adding sufficient half normal potassium hydroxide solution to an aluminum sulphate solution containing 55 parts of aluminum sulphate with 18 mols of water in 200 parts of water until the aluminum hydroxide which at first precipitates is again dissolved in the form of potassium aluminate. The reaction is aided by warming up the mixture to 40–50° C. and increased yields obtained by gradual addition of 2N sulphuric acid. The product is a diluted aluminum zeolite, which is not an effective catalyst for the contact sulphuric acid process. Instead of the two-component aluminum zeolite, a three-component aluminum zeolite can be prepared, in which part of the aluminum is introduced in the form of an alkali metal aluminate and the other part in the form of an aluminum salt.

An aluminum zeolite of the character of an aluminum double silicate can also be prepared by causing an aluminum sulphate solution to react with the waterglass solution, to which sufficient alkali has been added so that when all of the aluminum sulphate has been introduced the mixture still reacts alkaline to phenolphthalein.

Instead of the aluminum oxide component, other amphoteric metal oxides in the form of salts or metallates can be used, for example, oxides of beryllium, cadmium, zirconium, zinc and titanium, singly or in mixtures. These amphoteric metal oxides may also be used in conjunction with aluminum.

The diluted zeolites are broken into fragments, impregnated at an elevated temperature with 12 parts of $V_2O_5$ in the form of an ammonium vanadate solution, and then impregnated with 7.12 parts of ferric chloride dissolved in 100–150 parts of water. The product is again dried, and constitutes a zeolite impregnated with iron vanadate. The zeolite is calcined in order to remove the ammonium chloride formed, which results in a still further increase in the porosity of the product, and is then treated with 7% burner gases, an excellent contact sulphuric process soon setting in.

In a similar manner, other salts of vanadic acid can be used, such as for example, copper vanadate, silver vanadate, manganese vanadate, titanium vanadate, cobalt vanadate or nickel vanadate, either alone or together with iron vanadate. Mixtures of these salts may of course also be used.

It is possible also to substitute part of the vanadates by the corresponding tungstates or molybdates. Salts of tetravalent vanadium acids may also be used.

Instead of forming the salts as described, $V_2O_5$ can be introduced into zeolites by impregnation with ammonium or potassium vanadate solutions, followed by a treatment to remove the base, for example, by calcining in the case of ammonium, or by treating with 7% burner gases. The $V_2O_5$ is embedded in the zeolite in a finely divided form. An equivalent amount of vanadyl sulphate may also be used, and yields a highly effective contact mass when used under the ordinary operating conditions as described in the foregoing examples.

*Example 5.*

A zeolite is prepared as described in Example 4, but instead of drying the gels they are at once mixed with salts of tetravalent or pentavalent vanadium, singly or in admixture, with salts of other oxygen metal acids, such as tantalates, tungstates, chromates and molybdates, the salt components being kneaded into the gel. After drying and treating in the usual manner, excellent catalysts for the contact sulphuric acid process are obtained.

Instead of introducing the salts of vanadium or other oxy-metal acids, the oxides can be prepared, for example, by kneading in potassium or ammonium vanadate in amounts containing 10 to 15 parts $V_2O_5$. A subsequent treatment with gases containing sulphur trioxide or spraying with dilute sulphuric acid then precipitates the $V_2O_5$ in a fine state of division in the zeolite.

*Example 6.*

400 parts of 33° Bé. waterglass are diluted with 6 to 8 volumes of water, and 497 parts of ferric sulphate containing 9 mols of water dissolved to form a 10% aqueous solution are added, producing on iron silicate which does not show any base exchanging powers. Into this iron silicate either wet or after drying, iron vanadate is introduced either ready prepared or in the form of components which cause its formation in situ. The iron vanadate may be prepared by dissolving 15 parts of $V_2O_5$ in about 15 parts of 90% sodium hydroxide and adding 15 parts of ferric sulphate with 9 mols of water in the form of a 15% solution. 100 parts of 33° Bé. waterglass are diluted with 6 to 7 volumes of water, and the iron silicate containing iron vanadate is stirred in to form a homogeneous suspension. 55 parts of aluminum sulphate with 18 mols of water are dissolved in 250 parts of water and normal potassium hydroxide solution is added until a clear potassium aluminate solution is obtained. Instead of using all of the aluminum in the form of an aluminate solution, part may be used as aluminum sulphate, in which case it will not be necessary at a later point to add acids to neutralize the excess of alkali in the zeolite components. The waterglass suspension and the aluminate solution are poured together, and the zeolite precipitated either by means of normal sulphuric acid or if part of the aluminum is present in the form of aluminum sulphate a three component zeolite is formed. The aluminum can be partly or wholly substituted by beryllium, cadmium or zirconium, singly or in mixtures.

The gel obtained is pressed in the usual manner, dried at temperatures below 100° C., broken into fragments and hydrated by permitting 400 to 500 parts of water to trickle over it. After hydration the exchangeable alkali metal bases may be partly exchanged for iron, copper, nickel, chromium, calcium or strontium by digesting the hydrated zeolite with a 5% solution of these metals. In the contact mass produced the catalytically effective component is the iron vanadate impregnated into the iron silicate, and this may be substituted partly or wholly by other metal salts of tetravalent or pentavalent vanadium, such as for example the silver salts or copper salts. The iron silicate may be considered here as a stabilizer promoter, which promotes or tunes the stabilizing effect of the zeolite.

*Example 7.*

14 parts of $V_2O_5$ are suspended in 250 parts of water to form a slurry, and acidified with 5 parts of concentrated sulphuric acid. They are then reduced in the usual manner by means of gases containing $SO_2$ at the boiling temperature. A blue vanadyl sulphate solution is obtained. 125 parts of a 33° Bé. waterglass solution are diluted with 200 parts of water and about 40 parts of celite stirred in. The vanadyl sulphate is then added to the waterglass solution precipitating out vanadyl silicate. Care should be taken that after all the vanadyl sulphate has been added the reaction mixture is neutral to litmus. The precipitate is sucked and thoroughly washed, and is stirred into 100 parts of 33° Bé. waterglass, which has been diluted with four or five volumes of water. 55–60 parts of aluminum sulphate with 18 mols of water are dissolved in 200 parts of water and then transformed into potassium aluminate by means of N/2 potassium-hydroxide solution. The waterglass suspension and potassium aluminate solutions are then poured together and sufficient normal sulphuric acid or other acids such as hydrochloric acid is added, until a gel is precipitated as quantitatively as possible. The mother liquor should show a strong alkaline reaction to litmus. The product is worked up in the usual way, broken into fragments and constitutes a zeolite contact mass containing vanadyl-silicate diluted with celite. The contact mass is calcined with air at 400° C., and when treated with 7–9% burner gases gives good yields of sulphur trioxide at 430–480° C.

An excellent contact mass is also obtained by drying the zeolite and coating it onto quartz or flint fragments by means of a little waterglass or alkali. The catalytic effectiveness remains, and considerable amounts of material are saved.

*Example 8.*

55 parts of aluminum sulphate containing 18 mols of water are dissolved in 300 parts of water, to which is added a solution containing 17 parts of ferric sulphate with 9 mols of water in 200 parts of water. An 8% sodium metavanadate solution is poured into the aluminum and iron sulphate solutions until 16 parts of $V_2O_5$ have been added. Vigorous agitation should be maintained, and a precipitate of iron-aluminum vanadate results, the precipitate being in a very fine state of subdivision. 120 parts of 33° Bé. waterglass diluted with 5 to 6 volumes of water are mixed with 60 to 80 parts of diatomite brick refuse, and the iron-aluminum vanadate is then added, together with sufficient normal potassium hydroxide solution so that after all of the vanadate suspension is added the mixture is still strongly alkaline to litmus. A zeolite is thus obtained in which the catalytically effective component is in the form of a diluent, and the product is worked up in the usual manner by pressing, washing with 400–600 parts of water and drying under 100° C. The contact mass is broken into fragments, calcined, and when treated with 6–9% burner gases at 430–480° C., gives excellent yields of sulphur trioxide up to 98% of the theoretical.

In a similar manner, other salts of vanadic acid or salts of tungstic and molybdic acids, for example, the silver, titanium, calcium, copper, cobalt, nickel or manganese salts may be used, singly or in mixture. After hydrating, these contact masses may also be treated with 5% silver-nitrated or copper nitrate, in order to introduce these elements into the zeolite in exchangeable form.

*Example 9.*

Instead of carrying out the reaction as described in Example 8, a potassium metavanadate solution, containing 16 parts of $V_2O_5$, is added to the diluted waterglass solution and then a solution containing 55 parts of aluminum sulphate with 18 mols of water and 17 parts of ferric sulphate with 9 mols of water are added, the reaction mixture remaining strongly alkaline to litmus. Most of the potassium vanadate is transformed into aluminum-iron vanadate, and is embedded in a very finely divided form in the zeolite. These contact masses when treated as described in Example 8 are excellent for the contact sulphuric acid process.

*Example 10.*

Natural or artificial zeolites, as for example, commercially obtainable, or zeolites which contain catalytically inactive diluents which may be considered as stabilizer promoters, are impregnated with an ammonium vanadate solution, or with an ammoniacal silver vanadate solution, and calcined or impregnated with calcium vanadate, lithium vanadate, cæsium vanadate, rubidium vanadate, and then sprayed with dilute suphuric acid or treated with gases containing sulphur trioxide forming $V_2O_5$ in a finely divided state in the zeolite structure. These products are excellent catalysts for contact sulphuric acid. The proportions of the impregnated salts may vary considerably, but in general I have found that the amount of $V_2O_5$ present should be about 10 to 15% by weight.

Example 11.

10.2 parts of aluminum oxide are dissolved by means of 40 parts of 100% KOH in 300 parts of water. 60–80 parts of kieselguhr are then impregnated with an ammoniacal silver vanadate solution prepared from 18.2 parts of $V_2O_5$ and 34 parts of silver nitrate dissolved in 20% ammonia water. After impregnation is complete the ammonia is removed by heating. The kieselguhr-silver vanadate mixture is stirred into the potassium aluminate solution, and then a solution containing 37 parts of ferric sulphate containing 9 mols of water in 250 parts of water is added with vigorous agitation, producing a non-silicious base exchange body, which contains a catalytically effective diluent and also kieselguhr. The thick precipitate formed is pressed, washed with about 200 parts of water in small portions, then dried as usual under 100° C., broken into fragments and calcined. The contact mass so obtained is an excellent sulphuric acid catalyst.

Instead of silver vanadate, copper vanadate, iron vanadate or manganese vanadate can be used, or the vanadate salt can be produced in the acid reaction component, namely, the iron sulphate solution, a corresponding amount of heavy metal salt, that is, either iron sulphate, copper sulphate or silver nitrate being added to react with 18.2 parts of $V_2O_5$ which is added in the form of the alkali metal metavanadate.

Example 12.

95 parts of a 33° Bé. potassium waterglass solution diluted with four to five volumes of water are mixed with 60 parts of infusorial earth, with vigorous stirring. 55.5 parts of aluminum sulphate containing 8 mols of water dissolved in 200 parts of water are treated with sufficient normal potassium hydroxide solution until until all the aluminum is dissolved as potassium aluminate. A 2% chloroplatinic acid solution containing 5 parts of platinum is then treated with a 3% formaldehyde solution, in order to precipitate the platinum in colloidal form. The waterglass and potassium aluminate solution and colloidal platinum solution are then poured together, and sufficient normal sulphuric acid is added to precipitate the zeolite quantitatively. The product is then sucked and dried at temperatures below 100° C., and constitutes a zeolite containing platinum and kieselguhr as diluents. When broken into fragments it is an excellent platinum sulphuric acid catalyst, when used under the usual working conditions with 7% burner gases at 400–450° C. The burner gases of course must be freed from compounds which act as catalyst poisons for platinum.

What is claimed as new is—

1. A contact sulphuric acid process which comprises passing gases containing sulphur dioxide and oxygen at reaction temperatures over a catalyst containing a catalytically ineffective base exchange body physically combined with a catalytically effective diluent.

2. A process according to claim 1, in which the base exchange body and diluent are united in a physically homogeneous structure.

3. A contact sulphuric acid process which comprises passing gases containing sulphur dioxide and oxygen at reaction temperatures over a catalyst comprising a catalytically ineffective base exchange body physically associated to at least one catalytically effective diluent and at least one catalytically ineffective diluent.

4. A process according to claim 3, in which at least part of the catalytically effective diluent component is impregnated into at least part of the catalytically ineffective diluent.

5. A process according to claim 1, in which exchangeable bases other than alkali metals are introduced into the base exchange body by base exchange.

6. A process according to claim 1, in which the catalyst contains a stabilizer.

7. A process according to claim 1, in which the catalyst contains a stabilizer and a stabilizer promoter.

8. A process according to claim 3, in which at least part of the catalytically ineffective diluent is a stabilizer.

9. A process according to claim 3, in which both stabilizers and stabilizer promoters are present in the diluent.

10. A method according to claim 1, in which the base exchange body contains exchangeable bases which react with sulphur trioxide to form stabilizers.

11. A process according to claim 1, in which the base exchange body is a zeolite.

12. The process according to claim 1, in which the base exchange body does not contain silicon.

13. A contact sulphuric acid process which comprises passing gases containing sulphur dioxide and oxygen at reaction temperatures over a catalyst containing a catalytically ineffective base exchange body having physically associated therewith a catalytically effective diluent, at least part of the catalytically effective component thereof being a compound of vanadium.

14. A process according to claim 13, in which the vanadium compounds are associated with other catalytically effective components not exceeding 15% by molecular equivalent weight of the vanadium compounds.

15. A contact sulphuric acid process which comprises passing gases containing sulphur dioxide and oxygen at reaction temperatures over a catalyst comprising a catalytically ineffective base exchange body physically associated with catalytically effective diluent containing at least one vanadium salt.

16. A process according to claim 15, in which at least one of the vanadium salts is a non-base exchanging vanadyl silicate.

17. A contact sulphuric acid process which comprises passing gases containing sulphur dioxide and oxygen at reaction temperatures over a catalyst comprising a base exchange body having catalytic activity but being catalytically ineffective associated with a catalytically effective diluent.

18. A process according to claim 17, in which the base exchange body contains a heavy metal in non-exchangeable form.

19. A process according to claim 1, in which the catalytically effective component of the diluent has been formed in situ.

20. A contact sulphuric acid process which comprises passing gases containing sulphur dioxide and oxygen at reaction temperatures over a catalyst comprising a catalytically ineffective base exchange body physically associated with a catalytically effective diluent, the catalyticaly effective component of which has been formed in situ from a compound containing removable constituents and which constituents have been removed by subsequent treatment under conditions to increase the porosity of the product.

21. The process according to claim 1, in which the diluted base exchange body is coated onto massive carrier fragments.

22. A process according to claim 1, in which the catalytically effective components are not platinum components and the reaction gases contain platinum catalyst poisons.

Signed at Pittsburgh, Pennsylvania, this 8th day of March, 1927.

ALPHONS O. JAEGER.